No. 766,644. PATENTED AUG. 2, 1904.
C. W. MOORE.
PEA HULLER.
APPLICATION FILED OCT. 21, 1903.
NO MODEL.

WITNESSES:
C. H. Walker.
H. A. Farnham.

INVENTOR
Cyrus W. Moore
BY Swift & Co.
Attorneys

No. 766,644.

Patented August 2, 1904.

UNITED STATES PATENT OFFICE.

CYRUS WADE MOORE, OF MILAN, TENNESSEE, ASSIGNOR OF ONE-HALF TO CALVIN L. THOMPSON, OF MILAN, TENNESSEE.

PEA-HULLER.

SPECIFICATION forming part of Letters Patent No. 766,644, dated August 2, 1904.

Application filed October 21, 1903. Serial No. 177,988. (No model.)

*To all whom it may concern:*

Be it known that I, CYRUS WADE MOORE, a citizen of the United States, residing at Milan, in the county of Gibson and State of Tennessee, have invented a new and useful Pea-Huller; and I do hereby declare the following to be a full, clear, and exact description of the invention, such as will enable others skilled in the art to which it appertains to make and use the same.

The invention relates to improvements in pea-hullers; and it has for its object to improve the construction of pea-hullers and to provide a simple and comparatively inexpensive one adapted to rapidly hull and clean peas without breaking or wasting the same and capable of being operated by a minimum of power.

The invention consists in the novel construction and arrangement of parts hereinafter described, and particularly pointed out in the claim hereto appended.

Figure 1:
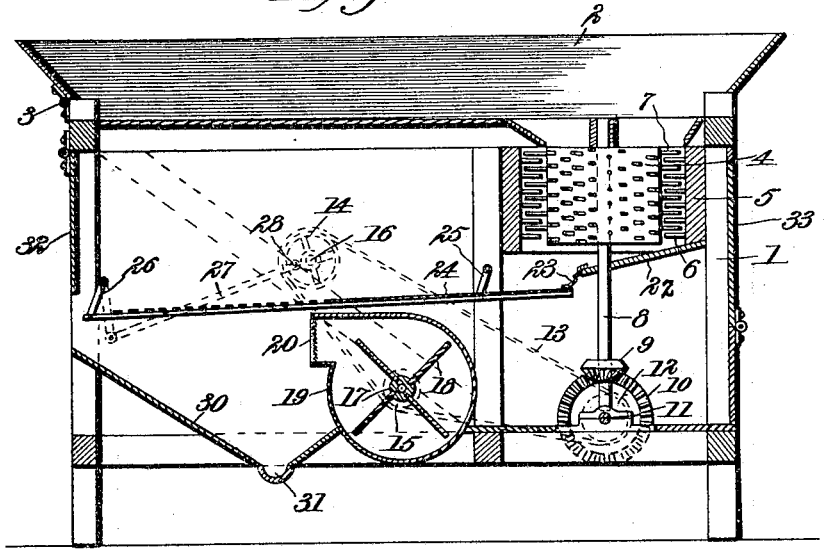
Figure 2:
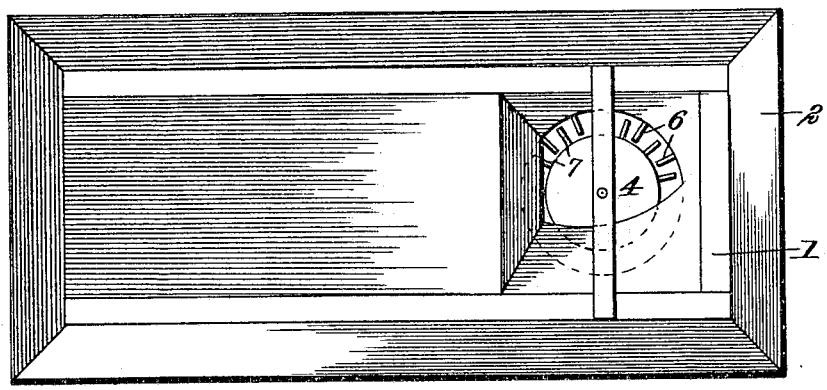
Figure 4:
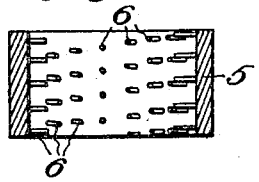
Figure 3:
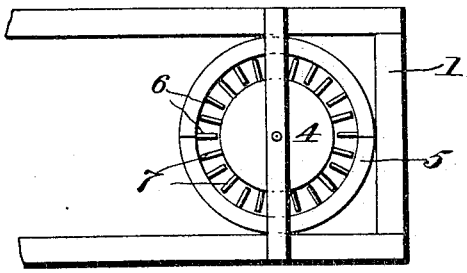

In the drawings forming part of this specification, and in which like numerals of reference designate corresponding parts, Figure 1 is a longitudinal sectional view of a pea-huller constructed in accordance with this invention. Fig. 2 is a plan view of the same. Fig. 3 is a horizontal sectional view of one end of the pea-huller, illustrating the arrangement of the cylinder and the concave. Fig. 4 is a sectional view of the concave, showing the spirally-arranged teeth.

Referring to the drawings, 1 designates a frame or casing designed to be constructed of any suitable material and provided at the top with a hopper 2, hinged at the end 3 to the frame or casing and adapted to be raised to afford access to the interior of the huller for repairing the hopper, the cylinder 4, and the concave 5, or other parts. The concave 5 is provided with fixed spirally-arranged teeth 6, which coöperate with similarly-arranged teeth 7 of the cylinder, whereby the hulls or pods are broken without bruising or breaking the peas. The cylinder, which may be of any desired construction, is mounted on a vertical shaft 8, journaled in suitable bearings of the frame or casing and provided at its lower end with a pinion 9, which meshes with a vertically-disposed gear-wheel 10 of a shaft 11. The shaft 11, which is disposed horizontally, carries a small pulley 12, run by a belt 13, which extends upward to a drive-pulley 14, and which also operates a fan-pulley 15. The drive-pulley 14 is mounted on a suitable shaft 16, journaled in suitable bearings of the frame or casing and designed to be operated by any suitable power. The horizontal fan-shaft 17, which is journaled in suitable bearings of the frame or casing, carries a fan 18, arranged within a cylindrical casing 19. The cylindrical casing 19 is provided with an outlet 20, and it is removable at the bottom of the frame to permit the fan to be taken out when necessary. The outlet is covered with wire-gauze or other suitable material, which prevents the peas from entering the fan-casing.

The peas in the hulls fall upon an inclined chute 22, which is located beneath the concave and the cylinder and which is connected at its lower end by a flexible strip 23 with a shaking-riddle 24, constructed of any suitable material, such as woven wire, perforated sheet metal, or the like. The flexible connection 23 yields to the reciprocation of the riddle and prevents the peas and the hulls from dropping from the other end of the riddle into the machine. The reciprocation of the riddle carries the peas and hulls downward, and the hulls are separated from the peas and blown out of the huller by the blast of air from the fan. The riddle is suspended by straps or links 25 and 26 within the frame or casing and is operated by a rod or pitman 27, extending from a wrist-pin 28 of the pulley or drive-wheel 14 to an arm 29, which is connected with the straps 26.

The peas drop through the riddle upon the chute 30, having inclined sides and extending downward to a spout 31, by means of which the peas are discharged from the huller.

The frame or casing is provided at its ends with hinged doors 32 and 33, which afford access to the interior of the huller. The cylinder may be driven at any desired speed by varying the diameter of the gears, and it will be clear that the pea-huller is exceedingly simple and inexpensive in construction, that it is adapted to lessen the power required for operating machines of this character, and that it is capable of rapidly hulling peas without bruising or otherwise injuring them.

What I claim is—

In a pea-huller, the combination of a fan, a hopper extending the length of the frame and hinged at one end to the same and provided at the other end with an opening, a vertical concave located beneath the opening and provided with teeth, a vertical cylinder operating within the concave and having teeth and provided with a vertical shaft, an inclined chute arranged beneath the cylinder and extending downward from one side of the concave and terminating short of the opposite side of the same, a shaking-riddle extending downward from the lower end of the chute to the rear end of the frame and provided at its upper end with an inclined flexible connection secured to the lower end of the chute and to the upper end of the shaking-riddle, a lower chute located beneath the rear portion of the riddle, a fan arranged beneath the upper or front portion of the riddle, and gearing for operating the cylinder, the fan and the riddle, substantially as described.

In testimony whereof I have hereto affixed my signature in the presence of two witnesses.

CYRUS WADE MOORE.

Witnesses:
J. R. HARRISON,
J. W. WADE.